July 13, 1937.　　　　E. G. McCAULEY　　　　2,087,062

HYDRAULIC BRAKE

Filed Sept. 17, 1929　　　3 Sheets—Sheet 1

INVENTOR
Ernest G. McCauley

BY Robert H. Young
ATTORNEY

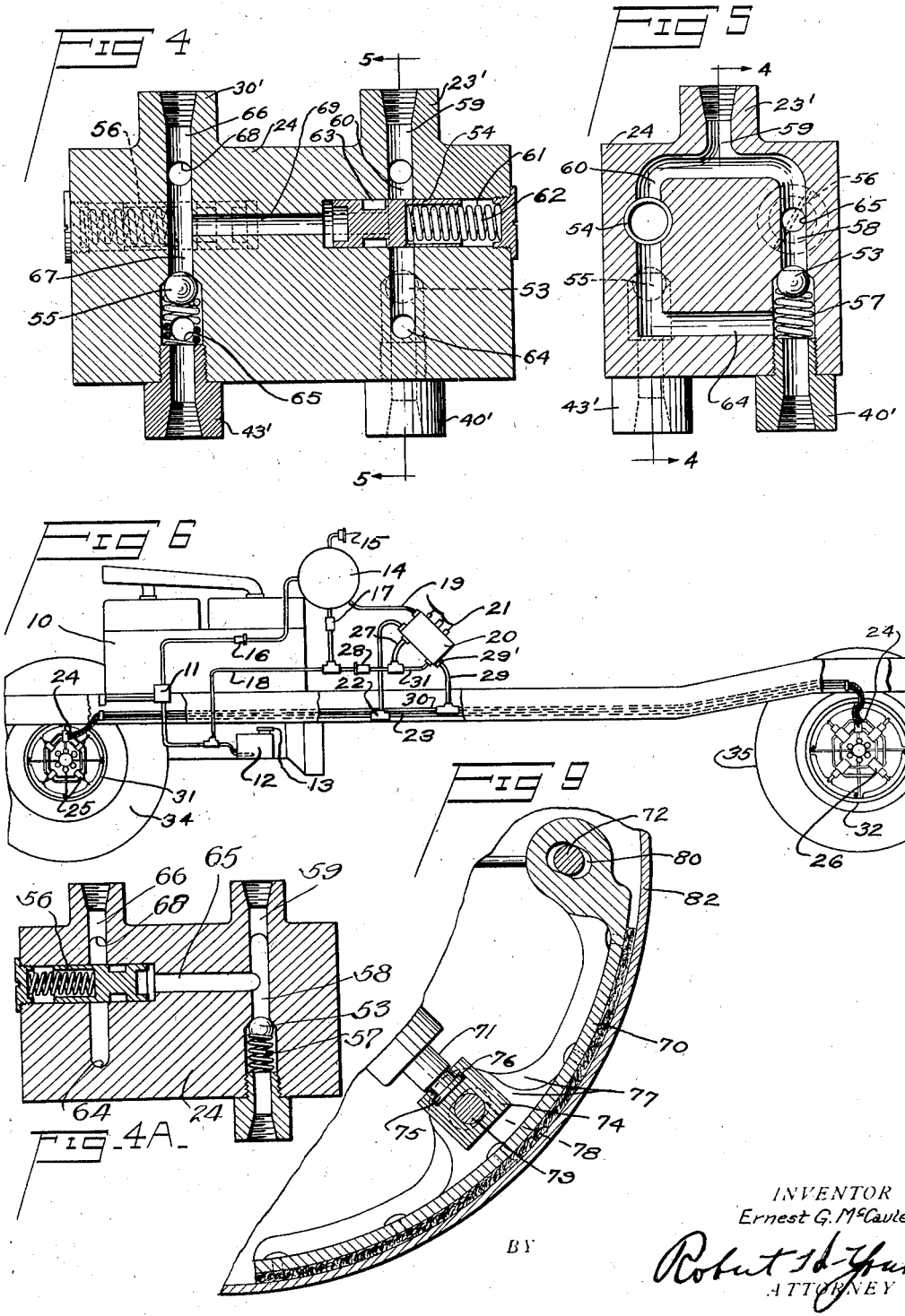

July 13, 1937.  E. G. McCAULEY  2,087,062
HYDRAULIC BRAKE
Filed Sept. 17, 1929   3 Sheets-Sheet 3
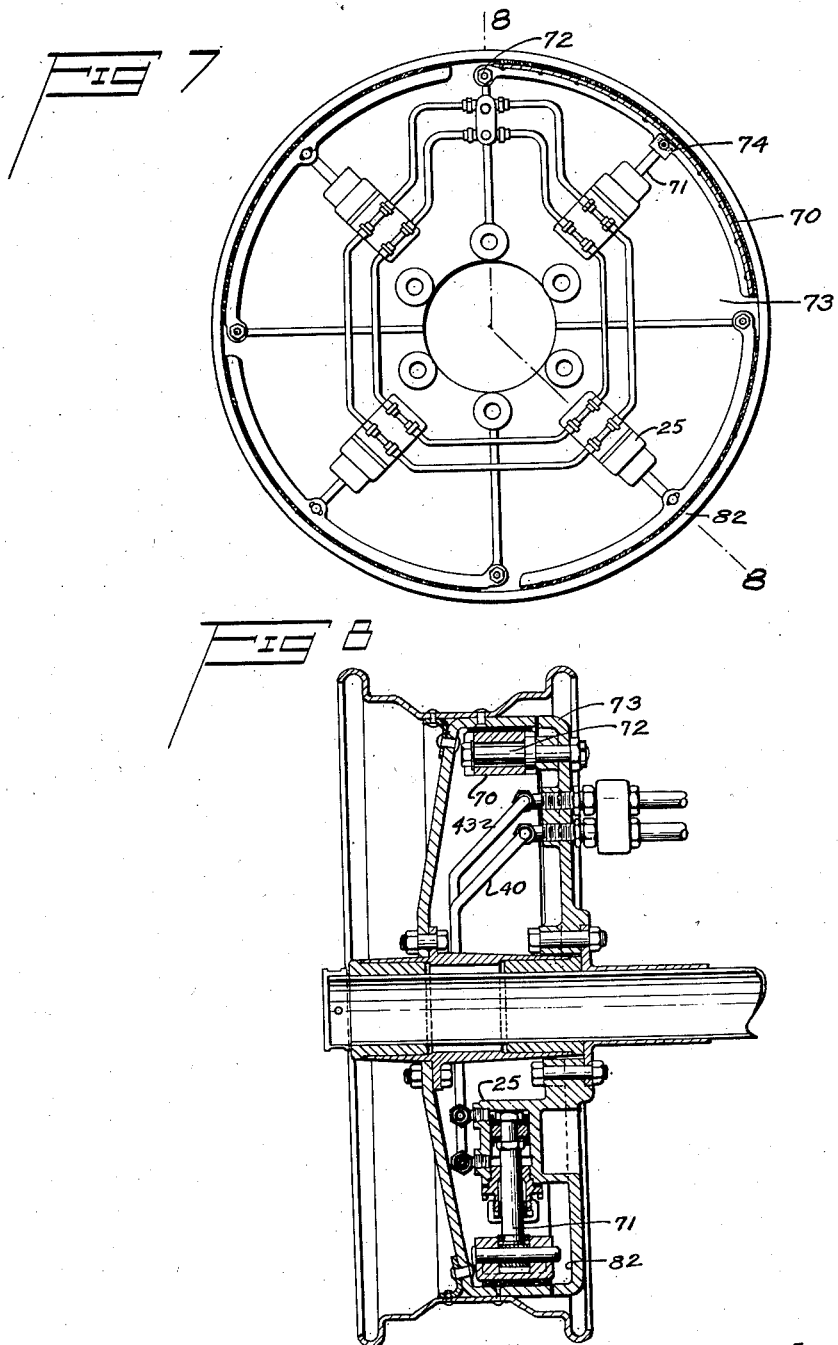
INVENTOR
Ernest G. McCauley.
BY
Robert Th. Young
ATTORNEY Patented July 13, 1937

2,087,062

UNITED STATES PATENT OFFICE 2,087,062

HYDRAULIC BRAKE

Ernest G. McCauley, Dayton, Ohio

Application September 17, 1929, Serial No. 393,237

15 Claims. (Cl. 188—152)

This invention relates to brakes and more particularly to fluid pressure operated brakes.

The object of the present invention is to provide a brake structure in which the brake shoes are operated by fluid pressure actuated pistons, the brake shoes being connected to the pistons in such a manner as to permit a swiveling action against the brake drum.

A further object of this invention resides in transmitting the torsional strain of the brake shoes to the axle structure thus relieving the pistons and the brake supporting pivot from torsional strains.

A further object of this invention is to provide in a brake mechanism having a plurality of fluid pressure actuated brake shoes, means for locking the brake shoes against movement in either an operative or inoperative position.

The invention is illustrated in the accompanying drawings in which:

Fig. 4 is a longitudinal section through a valve unit such as that appearing in Figs. 1 and 2 used in connection with a plurality of brake cylinders and is a view taken on the line 4—4 of Fig. 5.

Fig. 4A is a sectional view taken on the line 4A—4A of Fig. 5.

Fig. 5 is a transverse section, taken on the line 5—5 of Fig. 4.

Fig. 6 is a diagrammatic view of a fluid brake system according to my invention, also Fig. 7 is a further embodiment of my invention.

Fig. 8 is a sectional view taken on the line 8—8 of Fig. 7, and

Fig. 9 is a detail view showing brake shoe connecting means.

Figure 1:
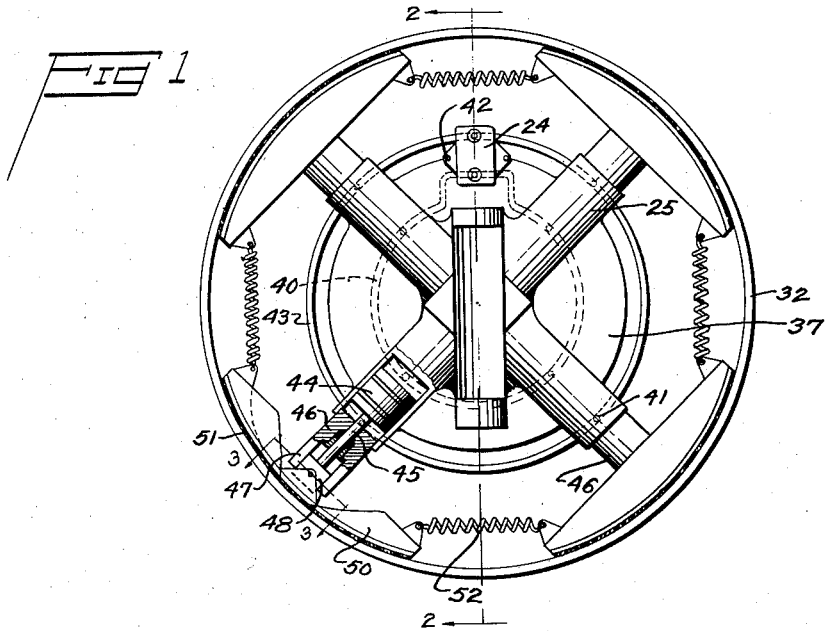
Fig. 1 is a view of a front wheel or knuckle piece having mounted thereon braking means constructed in accordance with the invention, for operation with a front wheel brake drum.

Referring first to Fig. 6 for a general understanding of the system to which the invention relates, the engine 10 has an oil pump 11, either separate from or a part of the oil pump of the engine and driven from the engine. The pump 11 receives a non-freezing hydraulic fluid such as glycerine from a low-level reservoir 12 which may conveniently be provided with a refill cap 13 and a vent to maintain the tank 12 at atmospheric pressure. The pump 11 supplies fluid to the storage tank 14 under pressure, preferably beneath a cushion of air compressed in the upper part of the tank, the pressure being indicated by a guage 15. A check valve 16 serves to trap the pressure in the tank 14, thus in the event the engine is not running, a reserve pressure is at hand which may be used to hold the car parked on a hill or the like. The pressure in the tank 14 is kept at a predetermined desired value by a relief valve 17 which has a drain connection 18 leading back to the intake side of the pump 11, capable of draining directly to the tank 12. A connection 19 from the tank 14 supplies pressure fluid to the master control valve unit 20, which may be conveniently mounted beneath the toe board of the car for control by the operator by a pedal 21. The control unit 20 a detailed description of which is given in my Patent No. 1,550,550 has a connection 22 with a line 23 on each side of the chassis, connected at opposite ends with valve units 24 for the front and rear brake cylinders 25 and 26 respectively. Upon the depression of the toe of the pedal 21, as will be hereinafter described, fluid is supplied under pressure through the lines 23 to apply the brakes. Upon the release of the pressure from the master control unit, the auxiliary control units trap the pressure at the brakes to keep the brakes applied. The pressure in the lines 23 is relieved through the connection 22 by a drain connection 27, communicating with the line 18 through a check valve 28. In this way the pressure in the lines extending from the master control unit to the auxiliary units 24 is relieved, and the likelihood of appreciable leakage is reduced to a minimum. Upon a reverse operation of the pedal 21, that is by a depression of the heel thereof, pressure is supplied through the connection 29 to the lines 30 on opposite sides of the chassis, leading forwardly and rearwardly to the auxiliary valve units 24 to release the brakes. In this case the pressure is similarly relieved in the line on release of the pedal through a drain connection 31 from the master control unit 20, communicating with the line 18 leading to the intake side of the pump. The check valve 28 insures against the possibility of a back flow of pressure fluid to the master control valve, due to a passage of pressure fluid through the relief valve 17. The general operation of the system will now be apparent; so that further detailed description of various phases of improvements therein may be understood.

Figure 2:
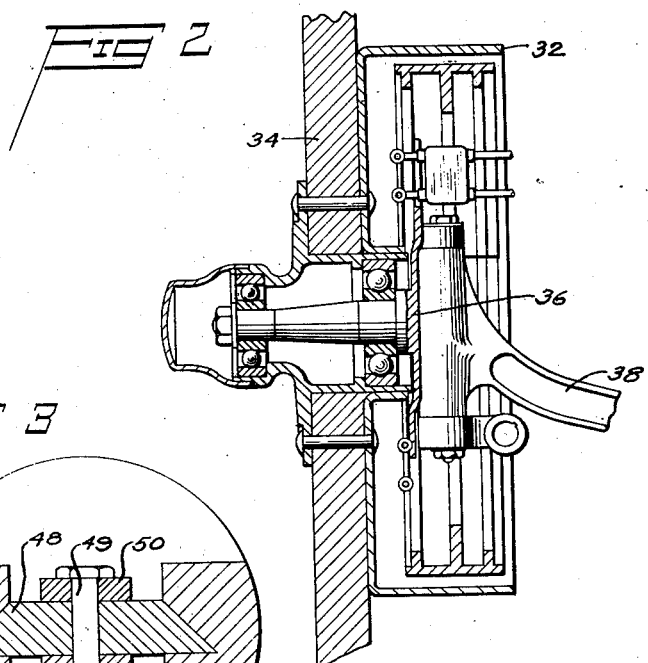
Fig. 2 is a vertical section through a front wheel at the axle showing the application of the braking means thereto.
Figure 3:
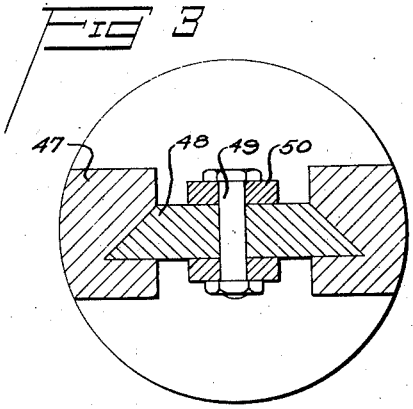
Fig. 3 is a detail in section taken on the line 3—3 of Fig. 1 looking in the direction of the arrows.

Referring now to Figs. 1 to 3 particularly, the auxiliary valve unit 24 is illustrated in connection with four radially arranged front wheel brake cylinders 25. The cylinders 25 are preferably cast integrally with the front wheel axle or knuckle piece 36, and have a continuous web 37 interconnecting the cylinders to give strength and rigidity to the assembly. The knuckle piece 36 is mounted in the usual manner upon the front axle 38 and carries a front wheel 34 on suitable bearings. The brake drum 32 is bolted or otherwise secured upon the wheel 34 to be concentric with the radially arranged cylinders 25. The inner ends of all of the cylinders are connected by a substantially circularly formed fluid line 40, having T connections 41 or the like at each of the cylinders in order. The line 40 is connected similarly with the auxiliary valve unit 24 which may be fastened to the web 37 as by screws 42. The outer ends of all of the cylinders are similarly connected by a substantially circularly formed fluid line 43. Pistons 44 operate within the several cylinders, and move radially outwardly when pressure fluid is admitted at the inner ends of the several cylinders through the line 40. There is a simultaneous escape of fluid from the outer ends of the several cylinders through the line 43 by virtue of the valves at the auxiliary unit 24 presently to be described.

The pistons 44 have rods 45 operating in packed openings in heads 46, mounted in any convenient manner in the outer ends of the cylinders 25. The heads 46 are provided with radial guides 47 for cross heads 48 mounted on the outer ends of the piston rods 45. The cross heads 48 are pivotally connected as shown at 49 with the brake shoes 50. The latter are provided with the usual brake lining 51. The shoes 40 are preferably channel shaped, both for the purpose of lightness and to provide cooling ribs for conducting the heat incident to the braking action away from the brake lining and the drum, to prevent burning of the brake lining. The cooling of the brake shoes and of the brake drum is increased also by having the brake shoes of a size leaving ample space between adjacent shoes for air to circulate. The adjacent shoes are interconnected by tension springs 52 avoiding any possibility of a shoe dragging on the drum after release. The pivotal mounting of the shoes on the piston rods provides for adaptability to the braking surface. Despite unevenness in the wearing of the brake lining when the brakes are applied, all of the pistons are moved outwardly in their cylinders, under a like pressure, each brake shoe engages the drum evenly, and a braking effect substantially alike is secured in each shoe. In the release of the brakes, since the pressure acting on each piston is identical, all of the shoes are retracted simultaneously and in this operation the interconnection of all of the shoes by spring means further facilitates the instantaneous and simultaneous release of the brakes.

Referring now to Figs. 4 and 5 particularly, in which the auxiliary valve units 24 are more particularly illustrated, it will be seen that the units have connections 23' and 30', to be associated with the lines 23 and 30 respectively extending along the chassis from the master control valve 20. There are also control valve outlets 40' and 43' for the fluid lines 40 and 43 respectively of the brake cylinders. An inlet valve 53 and an outlet valve 54 are provided for the line 40 between the connections 23' and 40', and an inlet valve 55 and an outlet valve 56 are provided for the line 43 between the connections 30' and 43'. The valve 53 is of the ball check type and seats outwardly under the action of a spring 57 to close a duct 58, constituting one branch from a main duct 59, leading in through the connection 23'. The other branch 60 from the main duct 59 is closed normally by the valve 54. The latter is of the plunger or cylindrical type and operates in a bore 61 transverse to the duct 60, being held normally closed by a spring 62. The valve 54 in its open position has an annular groove 63 in register with the duct 60. The duct 60 communicates through a duct 64 with the duct 58 behind the valve 53. A longitudinal duct 65 leads off from the duct 58 to the front of the valve 56 which is of the same type as the valve 54. When pressure fluid is admitted through the connection 23' it passes through the duct 59, being prevented from passage through the duct 60 by the valve 54, and passes through the duct 58 acting both on the valve 53 in the duct 58 and on the valve 56 in the duct 65. The valve 53 opens and fluid is admitted through the line 40 behind the pistons in all of the cylinders to apply the brakes. The valve 56 is opened under the pressure against the action of the spring, so that fluid is allowed to leave the cylinders from in front of the pistons through the line 43. The fluid passes through the connection 43', and since the check valve 55 is closed by spring 57 it cannot pass out directly but by-passes through the duct 64, leading up past the valve 56, similarly as the duct 60 passes the valve 54. The escaping fluid leaves through the connection 30' through the line 30, the master control valve 20, drain connection 31 and line 18, to the intake side of the pump 11, or other reservoir tank 12. So long as the pressure is admitted to the duct 59 of the connection 23' the valve 56 and the valve 53 remain open. Immediately upon the subsidence of the pressure by the operator releasing pressure on the pedal, the valve 56 and the valve 53 close and the pistons are held in their adjusted position, inasmuch as there can be no further fluid movement either into or out of the brake cylinders. The operation referred to was for applying the brakes.

The brakes remain applied until released by a reverse application of pressure fluid. In releasing the brakes, fluid is admitted through the connection 30' which has a duct 66 similar to the duct 59, having one branch 67 leading to the valve 55 and another branch 68 leading to the valve 56, the two branches being connected by a duct 64. A longitudinal duct 69 similar to the duct 65 leads off from the duct 67 to the front of the valve 54. The action here is similar to that above referred to, when pressure is admitted through the connection 30'; the valve 55 opens under the action of the pressure fluid to admit pressure to the line 43 to retract all of the pistons in the several cylinders. Concurrently with the opening of the valve 55, the valve 54 opens to permit the escape of fluid from behind the pistons through the line 40. This fluid cannot pass the valve 53 since the latter is held closed by the spring 57, but passes through the duct 64 and out through the duct 60 past the open valve 54 and thence out through the line 23, eventually reaching the intake side of the pump; as in the case above described, immediately upon the release or subsidence of pressure from the master valve, both the valves 55 and 54 close and trap the pressure in the cylinders by preventing further movement of the fluid either into or out of the cylinders.

Figs. 7, 8, and 9 show a further embodiment of my invention as applied to an airplane wheel in which the brake shoes 70 although pivotally connected with the piston rods 71 have a limited freedom of movement relative thereto and in which the torsional strain is taken up by a torsion pin 72 interconnecting one end of the shoe 70 and the axle plate 73 as hereinafter described. A block 74 (Fig. 9) is slidably connected with the piston rod 71 through a tongue 75 and groove 76 connection. The block 74 is disposed between the flanges 77 of the brake shoe 70 with the groove 76 at right angles to the flanges, to permit the brake shoe to move laterally with respect to the piston rod 71. The block 74 is also slidably connected with the brake shoe 70 by means of an arcuate slot 78 provided in the flanges 77 of the brake shoe 70 and longitudinally disposed and a pin 79 fixed to the block 74 and slidable in the slots 78. It will thus be seen that with this arrangement, a limited universal connection is provided between the piston rod 71 and brake shoe 70.

The brake shoe 70 is provided with an arcuate slot 80 at one end to receive the torsion pin 72. This slot is similar in construction to the arcuate slot 80, and the diameter of the torsion pin 72 is the same as that of pin 79. The radii of the slot 78 are laid off from the center of wheel whereas the radii of the slot 80 are laid off from the axis of the pin 79. It will be apparent that when the brake shoe 70 is applied to the brake 82, there will be no dragging at one point of the brake shoe on the drum by reason of the fact that the entire shoe instantly swivels about the torsional pin 72 and aligns with the brake drum 82. Nor will slight lateral or longitudinal movement by the brake shoe effect a bending or deflection of the piston rod 71 by reason of these slidable connections. Whatever torsional effect that may be set up, either in a forward or aft direction by a rotation of the wheel, is taken care of by the torsion pin 72. Since the brake shoe is formed to pivot about the pin 79 and slidably pivotably connected with the torsion pin 81, an accurate alignment and readily adaptability of the brake shoe against the brake drum is obtained during the braking action.

What I claim as new and desire to secure by Letters Patent is:—

1. A brake mechanism comprising, a rotary member having a bearing surface, a part operatively adapted to frictionally engage the bearing surface of said rotary member, a means disposed within said rotary member and connected to said part to positively actuate the same by fluid pressure into and out of engagement with said bearing surface, and lost motion pivotally connecting means associated with said part whereby a uniform bearing pressure of said part along the bearing surface of said bearing member is obtained.

2. A brake mechanism comprising, a brake drum, a brake shoe having means thereon adapted to frictionally engage said brake drum, a means disposed within said brake drum and operatively connected to said brake shoe to actuate the same by fluid pressure into and out of engagement with said brake drum, and lost motion connection means including a pivoted connection associated with said brake shoe and said fluid pressure means for obtaining a uniform bearing pressure between said brake drum and friction means of said shoe.

3. A brake mechanism comprising, a brake drum, a brake shoe, supporting means connected to said brake shoe to bodily actuate the same against said brake drum, and lost motion connection means between said shoe and said supporting means to provide for lateral or longitudinal linear movement of said shoe relative to said support when engaging said drum.

4. A vehicle brake comprising in combination a vehicle wheel, a brake drum carried by said wheel, a radially arranged brake cylinder, a piston operating therein in opposite directions, said piston having a piston rod, means to supply fluid pressure to said cylinder to operate said piston, and a brake shoe pivotally connected to the rod of said piston to swivel against said brake drum and effect a uniform bearing pressure between said shoe and said drum.

5. A vehicle brake comprising in combination, a vehicle wheel, a brake drum carried by said wheel, a plurality of radially arranged brake cylinders, pistons operating therein and provided with piston rods, means to supply fluid pressure to said cylinders including an automatic fluid pressure operated unitary valve means for controlling the operation of said pistons in opposite directions and means forming a connection between said pistons and said shoes to provide for the alignment of said shoes with said brake drum.

6. A vehicle brake comprising in combination a vehicle wheel, a brake drum carried by said wheel, a plurality of radially arranged brake cylinders, pistons operating therein and provided with piston rods, means to supply fluid pressure to said cylinders to operate said pistons, brake shoes pivotally connected to the rods of said pistons and means to assume the side thrust of said rods upon the engagement of said shoes with said brake drum, said means comprising a member attached to said piston rod and interconnecting said rods and said brake shoes.

7. A brake mechanism comprising, a brake drum, a backing plate, a brake shoe, a movable support for said brake shoe, and lost motion connection means between said shoe and said support for obtaining a relative longitudinal linear motion therebetween and a lost motion connection between one end of said shoe and said backing plate for obtaining an energizing effect between said shoe and said drum.

8. A brake mechanism comprising, a brake drum, a backing plate, a brake shoe, a movable support for said brake shoe, and lost motion connection means between said shoe and said support for obtaining a relative longitudinal linear motion therebetween and a lost motion connection between one end of said shoe and said backing plate for obtaining an energizing effect between said shoe and said drum, and for limiting said longitudinal linear motion of said shoe.

9. A brake mechanism comprising, a brake drum, a brake shoe, a movable support for said brake shoe, and lost motion connection means between said shoe and said support for obtaining lateral linear and longitudinal linear motion therebetween.

10. A brake mechanism comprising, a brake drum, a brake shoe, a movable support for said brake shoe, and lost motion connection means between said shoe and said support for obtaining lateral linear and longitudinal linear and angular motion therebetween.

11. A braking mechanism comprising, a rotary member, a support, a part connected to said support and operatively adapted for frictional engagement with said member, a power means connected between said support and said part to actuate said part into operative and inoperative positions, and a control device attached to said support and operatively connected to said power means for automatically controlling the operation of said power means.

12. A braking mechanism comprising, a rotary member, a support, a part connected to said support and operatively adapted for frictional engagement with said member, a fluid pressure power means connected between said support and said part to actuate said part into operative and inoperative positions, and a fluid pressure responsive device attached to said support and operatively connected to said power means for automatically controlling the operation of said power means.

13. A braking mechanism comprising, a brake drum, a backing plate, a plurality of friction means connected to said backing plate and adapted for frictional engagement with said drum and a corresponding plurality of power devices for individually actuating said friction means into operative and inoperative positions, and means attached to said backing plate and operatively connected to said power devices for automatically controlling the operation thereof.

14. A braking mechanism comprising, a brake drum, a backing plate, a plurality of friction members connected to said backing plate and adapted for frictional engagement with said drum and a corresponding plurality of fluid pressure devices communicatively connected together in parallel for individually actuating said friction members into operative and inoperative positions, and fluid pressure responsive means carried by said backing plate and operatively connected to said devices for automatically controlling the operation thereof.

15. A vehicle brake comprising, in combination, a vehicle wheel, a brake drum carried by said wheel, a support, a plurality of radially arranged brake cylinders mounted on said support, pistons operating therein and provided with piston rods, and means to supply fluid pressure to said cylinders including a fluid pressure responsive control means for controlling the operation of said pistons in opposite directions.

ERNEST G. McCAULEY.